(12) United States Patent
Yokota (10) Patent No.: US 11,969,905 B2
(45) Date of Patent: Apr. 30, 2024

(54) CONTROL METHOD FOR ROBOT, AND ROBOT SYSTEM

(71) Applicant: Seiko Epson Corporation, Tokyo (JP)

(72) Inventor: Masato Yokota, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 251 days.

(21) Appl. No.: 17/482,546

(22) Filed: Sep. 23, 2021

(65) Prior Publication Data

US 2022/0088790 A1  Mar. 24, 2022

(30) Foreign Application Priority Data

Sep. 24, 2020  (JP) .................................. 2020-159559

(51) Int. Cl.
*B25J 9/00* (2006.01)
*B25J 9/16* (2006.01)

(52) U.S. Cl.
CPC .......... *B25J 9/1697* (2013.01); *B25J 9/0093* (2013.01); *B25J 9/1664* (2013.01)

(58) Field of Classification Search
CPC ...... B25J 9/1697; B25J 9/0093; B25J 9/1664; G05B 2219/39102; G05B 19/4182; Y02P 90/02; B65G 43/00; B65G 47/905; B65G 2203/0233; B65G 2203/0283; B65G 2203/041

See application file for complete search history.

(56) References Cited

U.S. PATENT DOCUMENTS

| | | | |
|---|---|---|---|
| 2018/0344573 A1 | 12/2018 | Hirano et al. | |
| 2019/0256300 A1* | 8/2019 | Shimamura | B25J 9/0093 |
| 2019/0352097 A1* | 11/2019 | Hou | B65G 15/64 |
| 2020/0368861 A1* | 11/2020 | Artigas | B25J 9/1633 |

FOREIGN PATENT DOCUMENTS

| | | |
|---|---|---|
| CN | 110733034 A | 1/2020 |
| JP | S62-100306 A | 5/1987 |

* cited by examiner

*Primary Examiner* — Khoi H Tran
*Assistant Examiner* — Tien Minh Le
(74) *Attorney, Agent, or Firm* — Harness, Dickey & Pierce, P.L.C.

(57) ABSTRACT

A control method for a robot performing a task on a workpiece conveyed by a belt conveyor having a moving belt is provided. The control method includes: causing a first image pickup device to detect an inclination between a first direction serving as a reference for traveling of the belt and a direction in which the belt is traveling, and a first distance that is a distance between the belt and a first reference position in a second direction orthogonal to the first direction at the first reference position; calculating a position of the workpiece as of when the workpiece is moved by the belt conveyor from a first position to a second position away from the first position by a second distance in the first direction, based on the inclination and the first distance detected by the first image pickup unit; and causing the robot to perform a task on the workpiece at the second position that is calculated.

6 Claims, 9 Drawing Sheets

CONTROL METHOD FOR ROBOT, AND ROBOT SYSTEM

The present application is based on, and claims priority from JP Application Serial Number 2020-159559, filed Sep. 24, 2020, the disclosure of which is hereby incorporated by reference herein in its entirety.

BACKGROUND

1. Technical Field

The present disclosure relates to a control method for a robot, and a robot system.

2. Related Art

According to the related art, a robot system in which a robot picks up a target object conveyed by a belt conveyor is known. When the belt of the belt conveyor meanders, the robot may fail in the pickup. JP-A-62-100306 discloses a correction mechanism for correcting the meandering of the belt. In this correction mechanism, a detection roller detects an end of the belt and outputs a detection signal to a carrier actuator. The carrier actuator adjusts the traveling direction of the belt and thus corrects the meandering of the belt.

However, to execute the method of JP-A-62-100306, a mechanism for correcting the meandering of the belt needs to be provided in the belt conveyor. The robot and the belt conveyor includes various structures, the mechanism for correcting the meandering may not be able to be installed. Therefore, a robot control method that enables the robot to perform a task on a workpiece without correcting the meandering of the belt is desired.

SUMMARY

A control method for a robot is a control method of a robot that performs a task on a target object conveyed by a conveyor having a moving belt. The control method includes: causing a detection unit to detect an inclination between a first direction serving as a reference for traveling of the belt and a direction in which the belt is traveling, and a first distance that is a distance between the belt and a detection reference position in a second direction orthogonal to the first direction at the detection reference position; calculating a position of the target object as of when the target object is moved by the conveyor from a first position to a second position away from the first position by a second distance in the first direction, based on the inclination and the first distance detected by the detection unit; and causing the robot to perform a task on the target object at the second position that is calculated.

A robot system includes: a conveyor having a moving belt with a target object placed thereon and conveying the target object; a detection unit detecting an inclination between a first direction serving as a reference for traveling of the belt and a direction in which the belt is traveling, and a first distance that is a distance between the belt and a detection reference position in a second direction orthogonal to the first direction at the detection reference position; a computing unit calculating a position of the target object as of when the target object is moved by the conveyor from a first position to a second position away from the first position by a second distance in the first direction, based on the inclination and the first distance detected by the detection unit; and a robot performing a task on the target object at the second position calculated by the computing unit.

DESCRIPTION OF EXEMPLARY EMBODIMENTS

First Embodiment

In this embodiment, a characteristic example of a robot system having a belt conveyor and a control method for a robot in this robot system is described.

Figure 1:
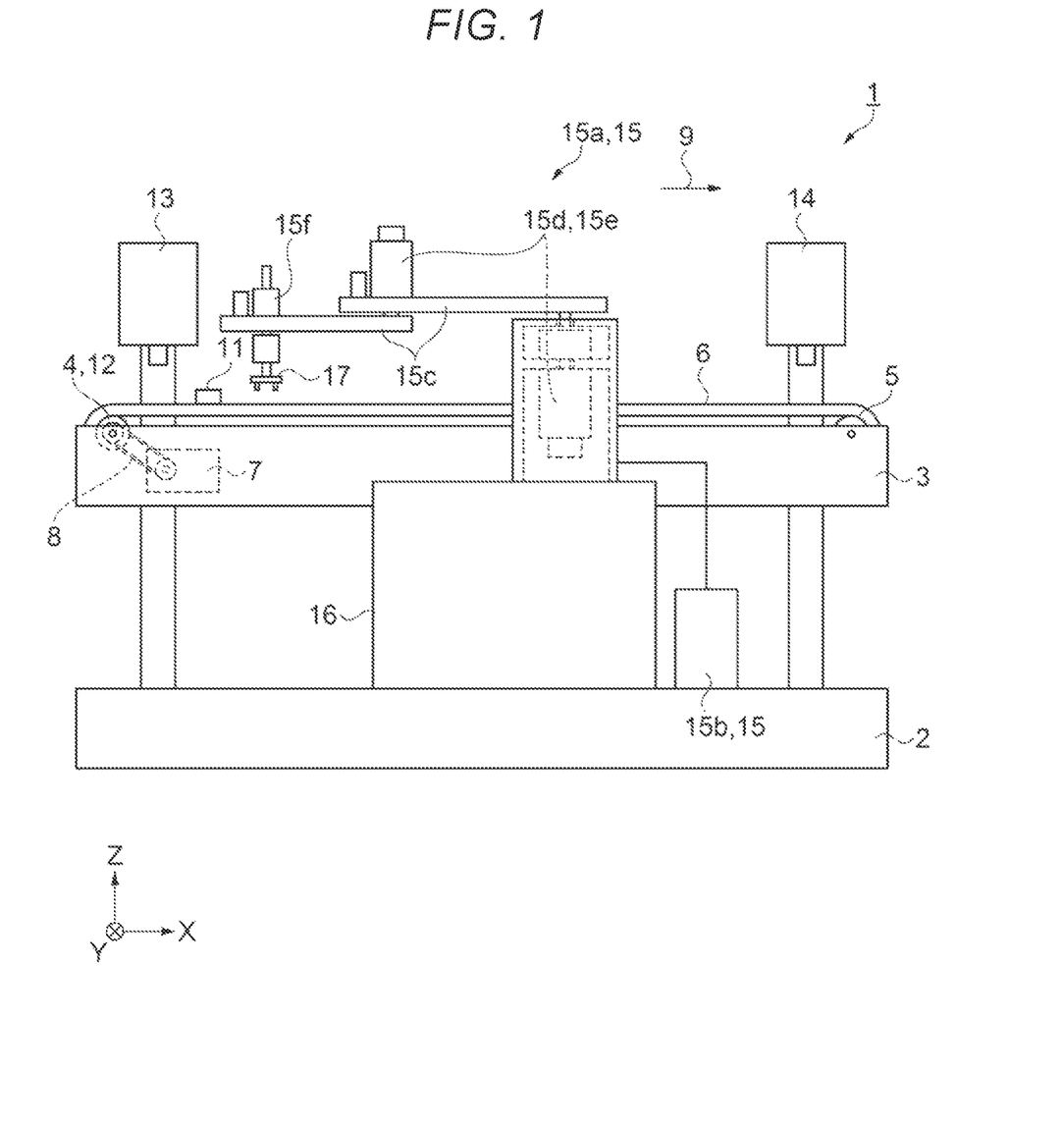
FIG. 1 is a schematic side view showing the configuration of a robot system according to a first embodiment.

As shown in FIG. 1, a robot system 1 has a belt conveyor 3 as a conveyor at the top of a base 2. The belt conveyor 3 has a first pulley 4 and a second pulley 5. A belt 6 is laid over the first pulley 4 and the second pulley 5. The belt conveyor 3 has a first motor 7. A torque of the first motor 7 is transmitted to the first pulley 4 by a transmission mechanism including a timing belt 8 or the like. When the shaft of the first motor 7 rotates, the first pulley 4 rotates and the belt 6 moves.

A direction toward the second pulley 5 from the first pulley 4 is defined as a positive X-direction. A direction along the width of the belt conveyor 3 is defined as a Y-direction. A direction toward the belt conveyor 3 from the base 2 is defined as a positive Z-direction. The X-direction, the Y-direction, and the Z-direction are orthogonal to each other.

When the belt conveyor 3 is installed at the base 2, the belt 6 is adjusted so as not to meander. The direction in which the belt 6 travels at this time is defined as a first direction 9. That is, it can be said that the first direction 9 is a direction serving as a reference for the traveling of the belt 6. In relation to the belt 6, the first pulley 4 is upstream and the second pulley 5 is downstream. The first direction 9 is the positive X-direction. A workpiece 11 as a target object is placed on the belt 6. The workpiece 11 is conveyed by the belt conveyor 3 having the moving belt 6. The traveling direction of the belt 6 may meander due to change with time. When the belt 6 meanders, the traveling direction of the belt 6 shifts from the first direction 9.

A first rotary encoder 12 as a detection unit is installed at the first pulley 4. The first rotary encoder 12 detects the angle of rotation of the first pulley 4. The angle of rotation of the first pulley 4 and the amount of movement of the belt 6 are directly proportional to each other. Therefore, the amount of movement by which the workpiece 11 moves in the first direction 9 is detected from an output from the first rotary encoder 12.

A first image pickup device 13, as a detection unit and an image pickup device, is arranged downstream from the first pulley 4 and in the positive Z-direction from the belt 6. A second image pickup device 14, as a detection unit and an image pickup device, is arranged upstream from the second pulley 5 and in the positive Z-direction from the belt 6. The first image pickup device 13 captures an image of the upstream of the belt 6. The second image pickup device 14 captures an image of the downstream of the belt 6.

The workpiece 11 is placed upstream from the image capture range of the first image pickup device 13. Therefore, after the workpiece 11 is placed on the belt 6, an image of the workpiece 11 is captured by the first image pickup device 13.

A robot 15 is installed between the first image pickup device 13 and the second image pickup device 14. The robot 15 has a robot main body 15a and a control device 15b. The robot main body 15a is installed at the top of an installation table 16 installed at the top of the base 2. The robot main body 15a has a plurality of arms 15c coupled to each other. The arms 15c have an actuator 17 at the distal end.

The robot main body 15a has a plurality of second motors 15d and second encoders 15e for rotating the respective arms 15c. The control device 15b drives the second motors 15d and the second encoders 15e and thus controls the position of the actuator 17.

The arms 15c have a lift device 15f at the distal end. The lift device 15f raises and lowers the actuator 17. The control device 15b drives the lift device 15f and thus controls the position of the actuator 17 in the Z-direction.

The actuator 17 is, for example, a hand gripping the workpiece 11, a motor driver, or the like. The control device 15b controls the driving of the actuator 17.

Figure 2:
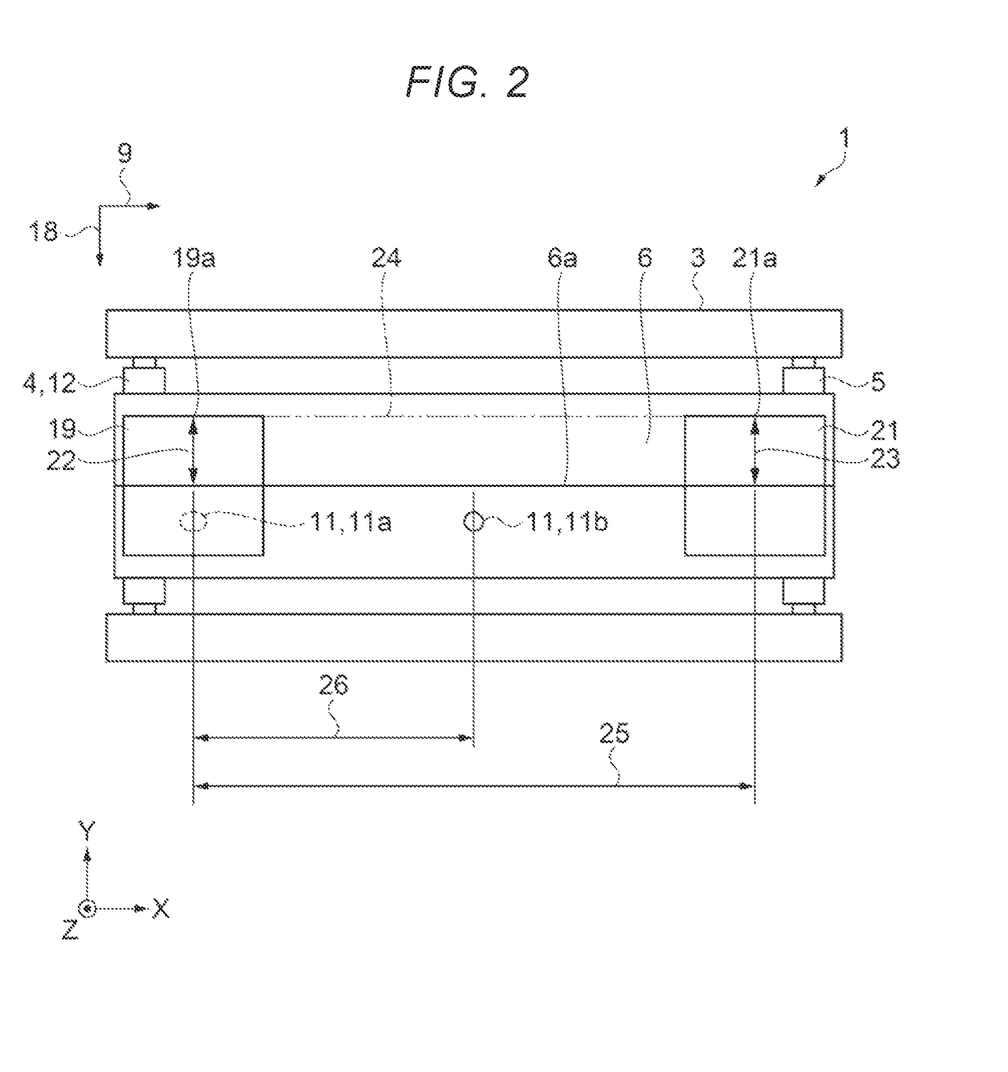
FIG. 2 is a schematic plan view showing the configuration of a belt conveyor.

In FIG. 2, the robot 15 is not illustrated. As shown in FIG. 2, a direction orthogonal to the first direction 9 in an XY plane is defined as a second direction 18. The second direction 18 is the negative Y-direction. FIG. 2 shows a first image capture range 19, which is a range captured in an image by the first image pickup device 13. FIG. 2 also shows a second image capture range 21, which is a range captured in an image by the second image pickup device 14. The first image capture range 19 and the second image capture range 21 are quadrilateral.

A middle point in the first direction 9 of the first image capture range 19 on the side in the positive Y-direction of the first image capture range 19 is defined as a first reference position 19a, which is a detection reference position. A middle point in the first direction 9 of the second image capture range 21 on the side in the positive Y-direction of the second image capture range 21 is defined as a second reference position 21a, which is a detection reference position. The first reference position 19a and the second reference position 21a are arranged near the two ends of the belt 6 in the first direction 9.

The belt 6 has a centerline 6a, which is a line along the direction in which the belt 6 travels. The centerline 6a is arranged at the center of the belt 6 in the Y-direction. The centerline 6a is a line along the first direction 9 in the state where the belt 6 does not meander.

A distance between the first reference position 19a and the centerline 6a in the second direction 18 is defined as a first distance 22. The first distance 22 is equivalent to a distance between the belt 6 and the first reference position 19a in the second direction 18 at the first reference position 19a. The first image pickup device 13 detects the first distance 22.

A distance between the second reference position 21a and the centerline 6a in the second direction 18 is defined as a third distance 23. The third distance 23 is equivalent to a distance between the belt 6 and the second reference position 21a in the second direction 18 at the second reference position 21a. The second image pickup device 14 detects the third distance 23.

In this configuration, the robot system 1 has the first image pickup device 13 and the second image pickup device in the detection unit. Based on the position of the centerline 6a of the belt 6 in images captured by the first image pickup device 13 and the second image pickup device 14, the position of the belt 6 in the second direction 18 can be detected.

A line connecting the first reference position 19a and the second reference position 21a is defined as an imaginary line 24. The imaginary line 24 is a line passing through the first reference position 19a and extending in the first direction 9. A distance between the first reference position 19a and the second reference position 21a in the first direction 9 is defined as an inter-reference distance 25. The inter-reference distance 25 has a known value that is set based on the positions of the first image pickup device 13 and the second image pickup device 14.

A distance between the first reference position 19a and the workpiece 11 in the first direction 9 is defined as a second distance 26. The first image pickup device 13 detects the workpiece 11 at a timing when the workpiece 11 passes a position overlapping the first reference position 19a, along the first direction 9. The first rotary encoder 12 detects a distance by which the belt 6 moves the workpiece 11 from the position where the first image pickup device 13 has detected the workpiece 11. The second distance 26 is detected by the first rotary encoder 12 and the first image pickup device 13.

Figure 3:
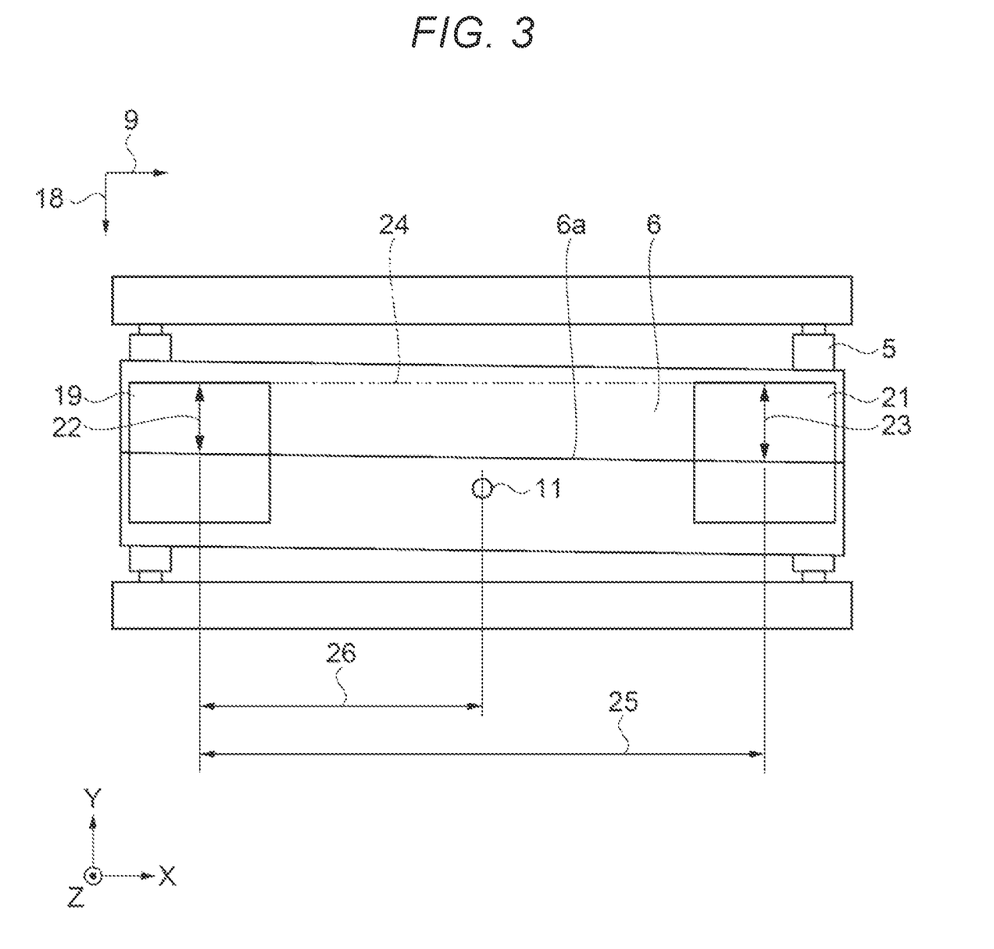
FIG. 3 is a schematic plan view of the configuration of the belt conveyor.

FIG. 3 shows a state where the belt 6 does not meander. The centerline 6a is oblique to the imaginary line 24. The first distance 22 is defined as Y1. The third distance 23 is defined as Y2. The inter-reference distance 25 is defined as L. The inclination of the belt 6 to the imaginary line 24 is expressed by (Y1−Y2)/L. In this way, by detecting the position of the belt 6 in the second direction in relation to the imaginary line 24, the inclination between the first direction 9 and the direction in which the belt 6 is travelling is detected.

In this configuration, the first image pickup device 13 and the second image pickup device 14 detect the position of the belt 6 near the two ends of the belt 6 in the first direction 9. Therefore, the inclination between the first direction 9 and the direction in which the belt 6 is travelling can be detected with high accuracy.

The second distance 26 is defined as Xcnv. The distance by which the workpiece 11 moves in the second direction 18 due to the inclination of the belt 6 is expressed by (Y1−Y2)*Xcnv/L. In this way, when the belt 6 meanders and inclines, the distance by which the workpiece 11 moves in the second direction 18 can be detected.

Figure 4:
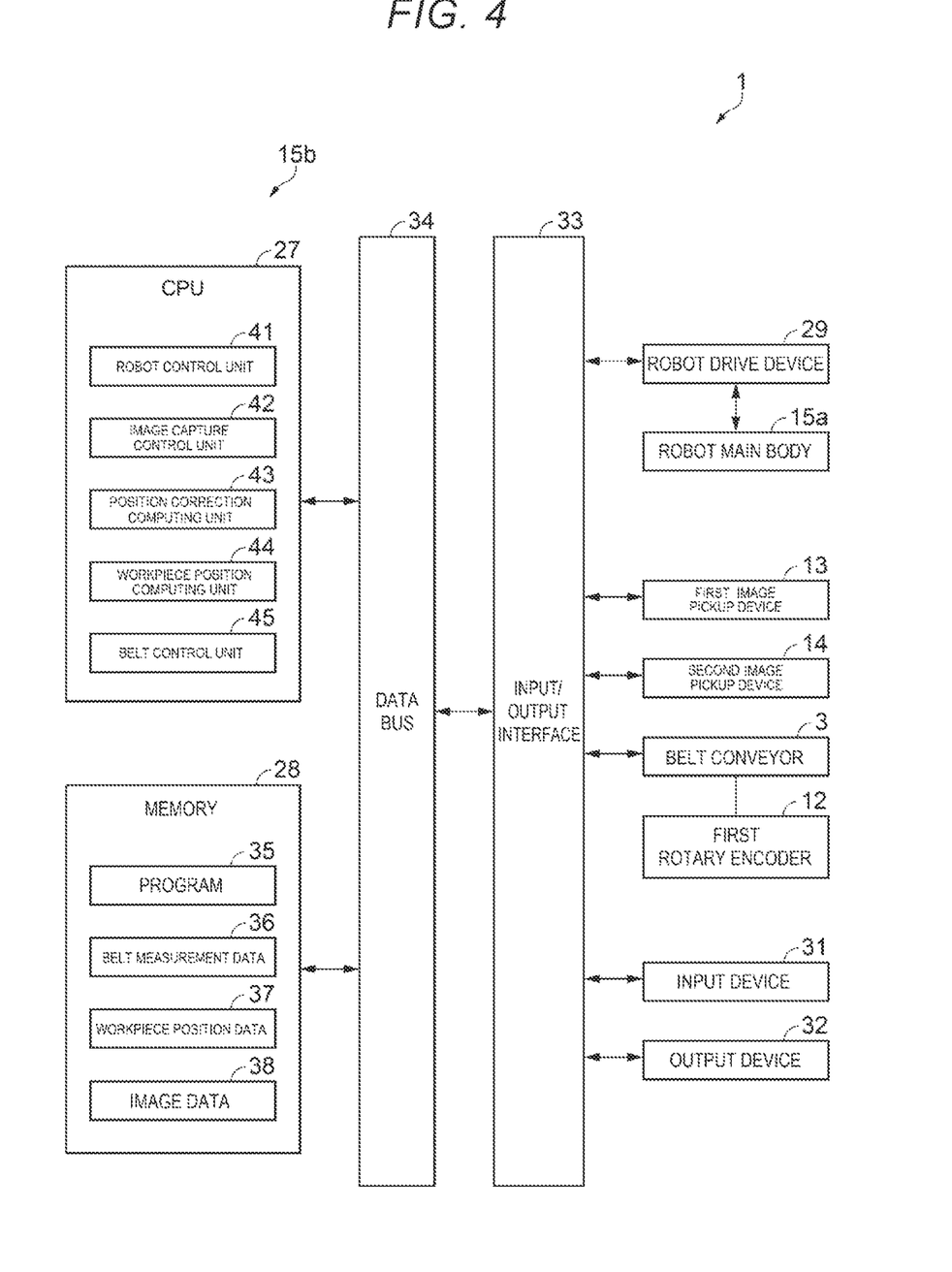
FIG. 4 is an electrical block diagram of the robot system.

As shown in FIG. 4, the control device 15b has a CPU (central processing unit) performing various kinds of computational processing and a memory 28 storing various kinds of information. A robot drive device 29, the first image pickup device 13, the second image pickup device 14, the belt conveyor 3, an input device 31, and an output device 32 are coupled to the CPU 27 via an input/output interface 33 and a data bus 34.

The robot drive device 29 is a device driving the robot main body 15a. The robot drive device 29 drives the second motor 15d, the second encoder 15e, the lift device 15f, and the actuator 17 of the robot main body 15a.

Data of images captured by the first image pickup device 13 and the second image pickup device 14 is transmitted to the CPU 27 via the input/output interface 33 and the data bus 34.

An output from the first rotary encoder 12 of the belt conveyor 3 is transmitted to the CPU 27 via the input/output interface 33 and the data bus 34.

The input device 31 is a keyboard, a joystick or the like. An operator operates the input device 31 to input various instructions.

The output device 32 is a display device, an external output device or the like. The operator views the display device and checks various kinds of information. The output device 32 has an external interface communicating with an external device.

The memory 28 is formed of a semiconductor memory such as a RAM (random-access memory) or a ROM (read-only memory). The memory 28 stores a program 35 describing procedures of operations of the robot main body 15a. The memory 28 also stores belt measurement data 36. The belt measurement data 36 is data representing a meandering and a positional shift of the belt 6. The memory 28 also stores workpiece position data 37. The workpiece position data 37 is data representing a position of the workpiece 11 on the belt 6. The memory 28 also stores image data 38. The image data 38 is data of images captured by the first image pickup device 13 and the second image pickup device 14. The memory also has a storage area functioning as a work area, a temporary file or the like for the CPU 27 to operate, and various other storage areas.

The CPU 27 drives the robot system 1 according to the program 35 stored in the memory 28. The CPU 27 operating according to the program 35 has a robot control unit 41 as a specific function implementation unit. The robot control unit 41 controls operations of the robot main body 15a.

The CPU 27 also has an image capture control unit 42 as a detection unit. The image capture control unit 42 controls the timing for the first image pickup device 13 and the second image pickup device 14 to capture an image. The image capture control unit 42 detects the first distance 22 from the image captured by the first image pickup device 13. The image capture control unit 42 detects the third distance 23 from the image captured by the second image pickup device 14.

In this configuration, the belt 6 has the centerline 6a along the direction in which the belt 6 is travelling. The first image pickup device 13 captures an image of the centerline 6a. The image capture control unit 42 can detect the position of the belt 6 in the second direction 18, based on the position of the centerline 6a in the captured image.

The CPU 27 also has a position correction computing unit 43 as a detection unit and a computing unit. The position correction computing unit 43 detects an inclination between the first direction 9 and the direction in which the belt 6 is travelling.

The position correction computing unit 43 calculates the position of the workpiece 11, based on the detected inclination between the first direction 9 and the direction in which the belt 6 is travelling, and the first distance 22. That is, the position correction computing unit 43 computes the amount of correction taken when the position of the workpiece 11 changes due to the meandering and the position shift of the belt 6.

The CPU 27 also has a workpiece position computing unit 44. The workpiece position computing unit 44 computes the position of the workpiece 11 as of when the belt 6 does not meander.

The CPU 27 also has a belt control unit 45. The belt control unit 45 controls the speed of movement of the belt 6. The belt control unit 45 takes in an output from the first rotary encoder 12 and recognizes the speed of movement and the amount of movement of the belt 6.

A control procedure for the robot system 1 including a control method for the robot 15 will now be described.

Figure 5:
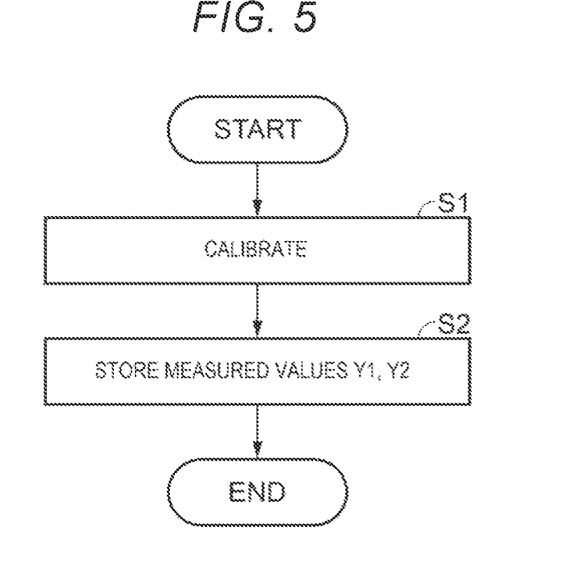
FIG. 5 is a flowchart of a control method for a robot.

FIG. 5 shows a preparatory task performed before the robot system 1 operates. In FIG. 5, calibration is performed in step S1. A positional relationship on a coordinate system controlling the robot main body 15a is measured with respect to the first image capture range 19, second image capture range 21, and the first direction 9, and stored in the memory 28. The processing then shifts to step S2.

The belt 6 is adjusted into a non-meandering state. In step S2, the first distance 22, the third distance 23, and the inter-reference distance 25 in the state where the belt 6 does not meander are measured. The first image pickup device 13 and the second image pickup device 14 each capture an image of the centerline 6a. The image capture control unit 42 measures the first distance 22 and the third distance 23, based on the captured images. The first distance 22 in the calibration step is defined as Y1cal. The third distance 23 is defined as Y2cal. The inter-reference distance 25 is defined as L. The image capture control unit 42 stores the values of Y1cal, Y2cal, L in the memory 28 as one of the belt measurement data 36. The value of L is a constant and therefore is updated only when it changes.

Figure 6:
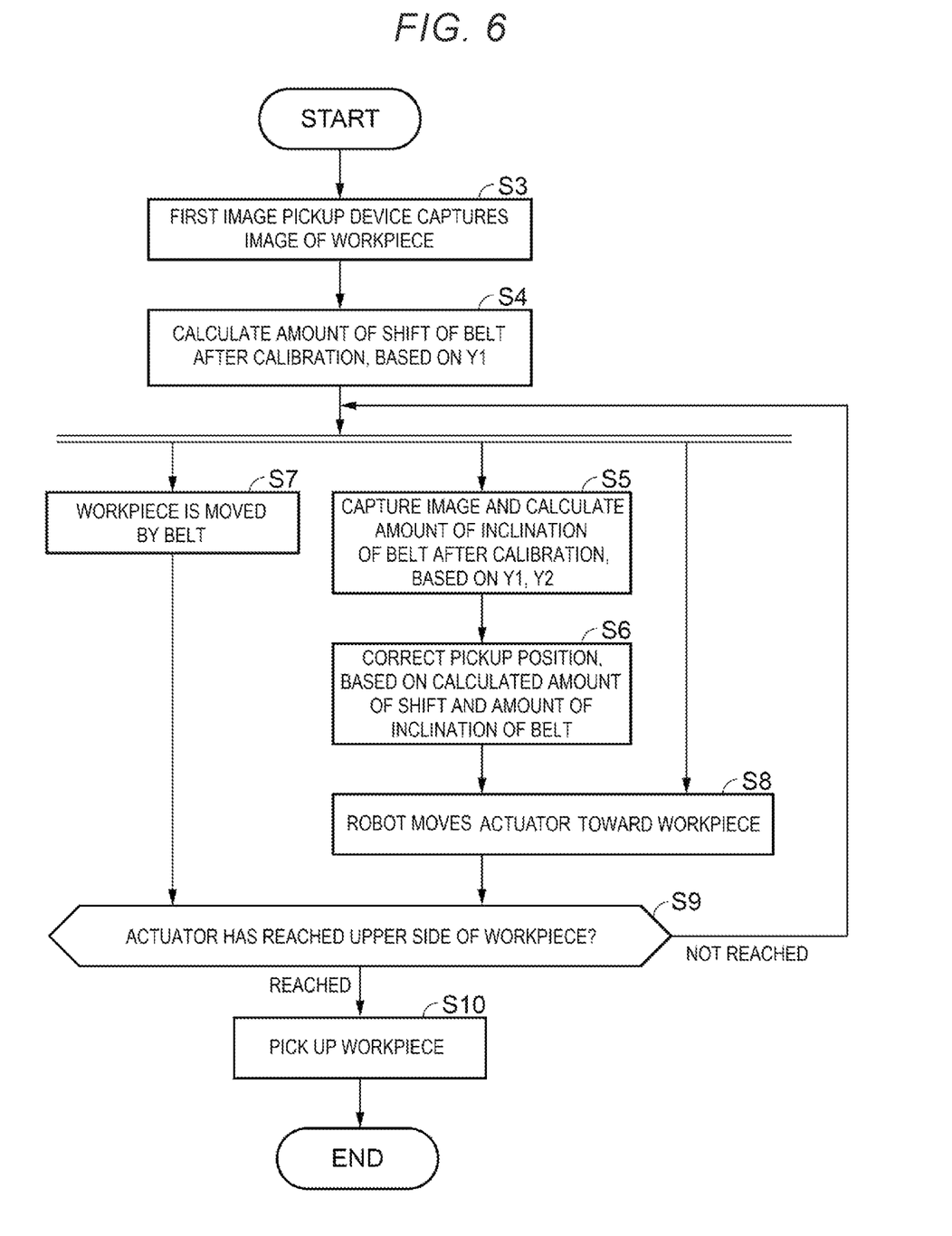
FIG. 6 is a flowchart of the control method for the robot.

FIG. 6 shows a procedure for the robot 15 to pick up the workpiece 11 conveyed by the belt 6. In FIG. 6, the first image pickup device 13 captures an image of the workpiece 11 in step S3. In FIG. 2, when the workpiece 11 is conveyed into the first image capture range 19, the first image pickup device 13 captures an image of the workpiece 11. The position of the workpiece 11 at this point is defined as a first position 11a.

The image capture control unit 42 detects the first position 11a and the first distance 22. The first distance 22 is defined as Y1img. The image capture control unit 42 stores Y1img in the memory 28 as one of the belt measurement data 36. The processing shifts to step S4.

In step S4, the position correction computing unit 43 calculates the amount of shift of the belt 6 after the calibration, based on Y1img. The amount of shift of the belt after the calibration is expressed by Y1cal-Y1img. The processing then shifts to step S5, step S7, and step S8.

Step S5, step S7, and step S8 are performed in parallel. In step S7, the workpiece 11 is moved by the belt 6 of the belt conveyor 3. In FIG. 2, the position to which the workpiece 11 is moved by the belt 6 of the belt conveyor 3 is defined as a second position 11b. The first position 11a and the second position 11b are away from each other by the second distance 26. The processing then shifts to step S9. In step S8, the robot 15 moves the actuator 17 toward the workpiece 11. The processing then shifts to step S9.

In step S5, the first image pickup device 13 and the second image pickup device 14 each capture an image of the centerline 6a. The first distance 22 is defined as Y1pic. The third distance 23 is defined as Y2pic. The position correction computing unit 43 calculates the amount of inclination of the meandering of the belt 6 after the calibration, based on Y1pic and Y2pic. The amount of inclination representing the inclination by which the belt 6 has changed after the calibration, due to the meandering, is expressed by ((Y1cal−Y1pic)−(Y2cal−Y2pic))/L. The processing then shifts to step S6.

In step S6, the workpiece position computing unit 44 calculates the second position 11b in the state where the belt 6 does not meander. Also, the position correction computing unit 43 corrects the pickup position, based on the amount of shift of the belt 6 calculated in step S4 and the amount of inclination calculated in step S5. The amount of correction is expressed by ((Y1cal−Y1pic)−(Y2cal−Y2pic))*Xcnv/L+ (Y1cal−Y1img).

In this way, based on the inclination and the first distance 22 detected by the first image pickup device 13, the second image pickup device 14 and the like, the position correction computing unit 43 calculates the position of the workpiece 11 as of when the workpiece 11 is moved by the belt 6 of the belt conveyor 3 from the first position 11a to the second position 11b away from the first position 11a by the second distance 26 in the first direction 9. The processing then shifts to step S8.

In step S8, the robot 15 moves the actuator 17 to the workpiece 11, toward the place of the second position 11b corrected by the position correction computing unit 43. After the workpiece 11 passes the first image capture range 19, the robot 15 moves the actuator 17 toward the second position 11b before the correction calculated by the workpiece position computing unit 44, until the result of the computation of the corrected second position 11b is outputted from the position correction computing unit 43. The processing then shifts to step S9.

In step S9, the robot control unit 41 takes in a signal outputted from the second encoder 15e and calculates the position of the actuator 17. The robot control unit 41 then determines whether the actuator 17 has reached the upper side of the workpiece 11 or not. When the actuator 17 has not reached the upper side of the workpiece 11, the processing shifts to step S5, step S7, and step S8. When the actuator has reached the upper side of the workpiece 11, the processing shifts to step S10. The upper side of the workpiece 11 in this case is the side in the positive Z-direction.

In step S10, the robot 15 performs a task on the workpiece 11 at the calculated second position 11b. That is, the actuator 17 picks up the workpiece 11. With this step, the procedure for the robot 15 to pick up the workpiece 11 ends.

In the configuration of the robot system 1 and the control method for the robot 15, the inclination between the first direction 9 serving as a reference for the travelling of the belt 6 and the direction in which the belt 6 is travelling, and the distance by which the belt 6 moves in the second direction 18, are detected. The workpiece 11 is moved by the belt 6 of the belt conveyor 3. Based on the inclination of the belt 6 and the distance by which the belt 6 moves in the second direction 18, the position of the workpiece 11 at the place where the robot 15 performs a task on the workpiece 11 is calculated. Therefore, even when the belt 6 meanders, the robot 15 can move the actuator 17 to and perform a task on the workpiece 11 located at the position on the meandering belt 6. Thus, even when the belt 6 meanders, the robot 15 can perform a task on the workpiece 11 without having to correct the belt 6.

Second Embodiment

This embodiment differs from the first embodiment in that step S5 is performed before step S7 and step S8.

Figure 7:
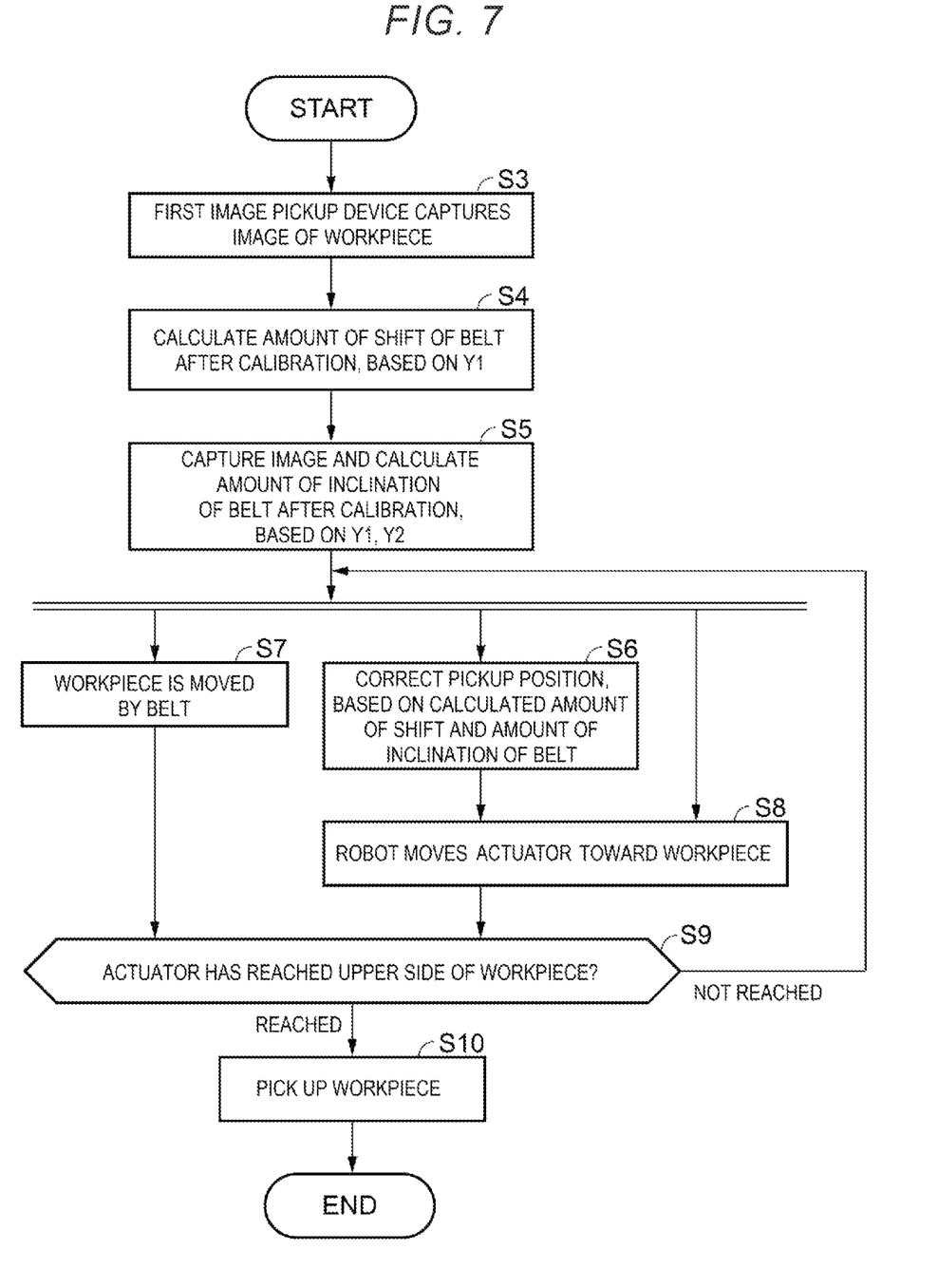
FIG. 7 is a flowchart of a control method for a robot according to a second embodiment.

In FIG. 7, step S3 and step S4 are the same as in the first embodiment. The amount of shift of the belt 6 after the calibration is expressed by Y1cal−Y1img. The processing then shifts to step S5.

The content of step S5 is the same as in the first embodiment. The amount of inclination of the belt 6 after the calibration, due to the meandering, is expressed by ((Y1cal−Y1pic)−(Y2cal−Y2pic))/L. The processing then shifts to step S6, step S7, and step S8. Step S6, step S7, and step S8 are performed in parallel.

In step S6, the workpiece position computing unit 44 calculates the second position 11b in the state where the belt 6 does not meander. Also, the position correction computing unit 43 corrects the pickup position, based on the amount of shift of the belt 6 calculated in step S4 and the amount of inclination calculated in step S5. The amount of correction is expressed by ((Y1cal−Y1pic)−(Y2cal−Y2pic))*Xcnv/L+ (Y1cal−Y1img). In step S6, the amount of inclination of the belt 6 is not calculated. Therefore, the load on the CPUC 27 can be reduced.

The other steps are the same as in the first embodiment and therefore not described further in detail. In this method, too, when the belt 6 meanders, the robot 15 can perform a task on a target object without having to correct the belt 6.

Third Embodiment

This embodiment differs from the first embodiment in that a step equivalent to step S4 is performed in parallel with step S7 and step S8.

Figure 8:
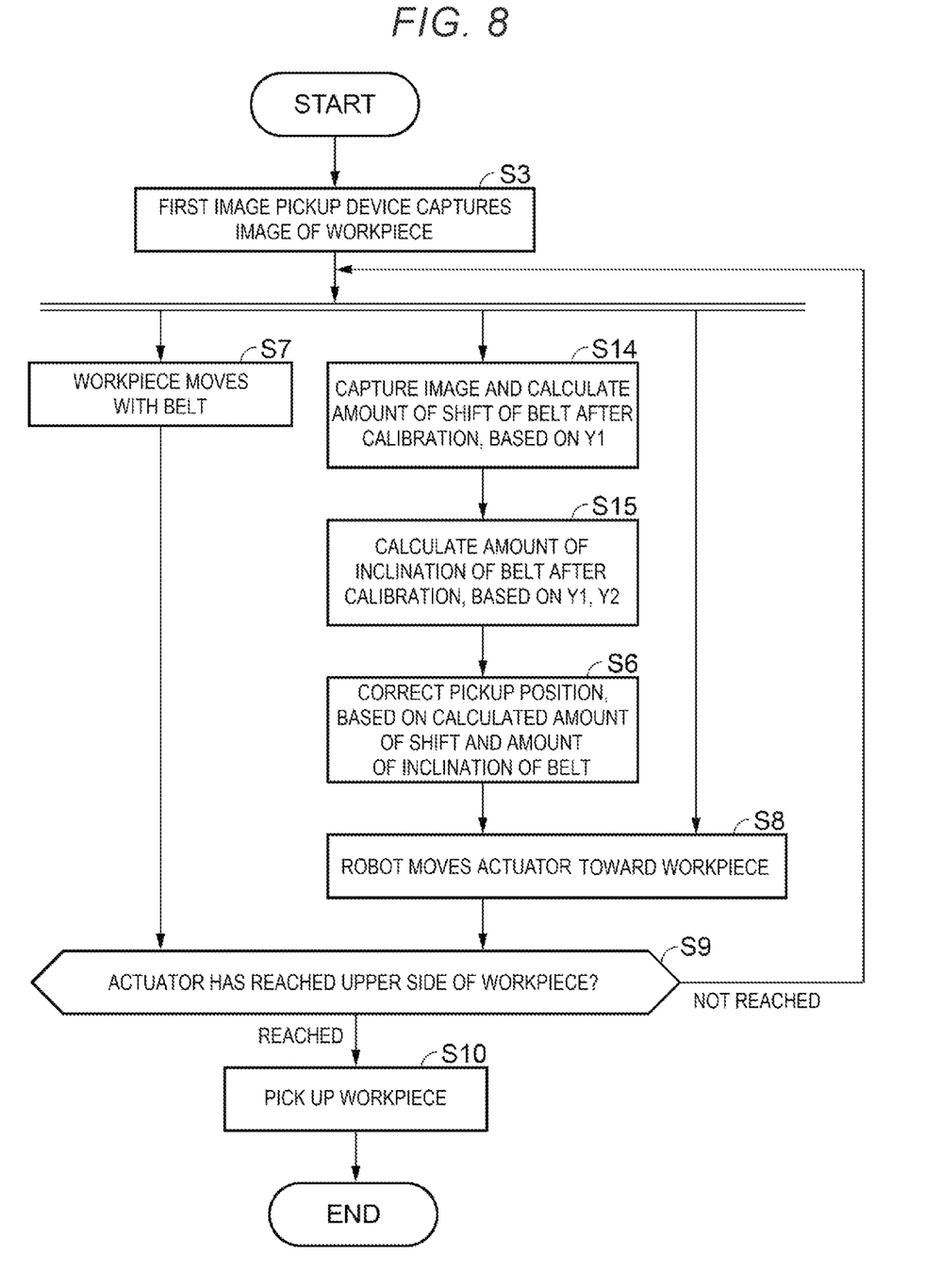
FIG. 8 is a flowchart of a control method for a robot according to a third embodiment.

In FIG. 8, step S3 is the same as in the first embodiment. The processing then shifts to step S14, step S7, and step S8. Step S7 and step S8 are the same as in the first embodiment and therefore not described further in detail.

In step S14, the first image pickup device 13 and the second image pickup device 14 each capture an image of the centerline 6a. The first distance 22 is defined as Y1pic. The third distance 23 is defined as Y2pic. The position correction computing unit 43 calculates the amount of shift of the belt 6 after the calibration, based on Y1pic. The amount of shift of the belt 6 after the calibration is expressed by Y1cal−Y1pic. The processing then shifts to step S15.

In step S15, the position correction computing unit 43 calculates the amount of inclination of the belt 6 after the calibration, due to the meandering, based on Y1pic and Y2pic. The amount of inclination of the belt 6 after the calibration, due to the meandering, is expressed by ((Y1cal−Y1pic)−(Y2cal−Y2pic))/L. The processing then shifts to step S6.

In step S6, the workpiece position computing unit 44 calculates the second position 11b in the state where the belt 6 does not meander. Also, the position correction computing unit 43 corrects the pickup position, based on the amount of shift of the belt 6 calculated in step S14 and the amount of inclination calculated in step S15. The amount of correction is expressed by ((Y1cal−Y1pic)−(Y2cal−Y2pic))*Xcnv/L+ (Y1cal−Y1pic). The processing then shifts to step S8.

The subsequent step S8, step S9, and step S10 are the same as in the first embodiment and therefore not described further in detail. In this method, too, when the belt 6 meanders, the robot 15 can perform a task on a target object without having to correct the belt 6. The first distance 22 and the third distance 23 are measured in parallel with the conveyance of the workpiece 11. Since the amount of shift and the amount of inclination of the belt 6 are calculated, the amount of correction can be detected with high accuracy.

Fourth Embodiment

Figure 9:
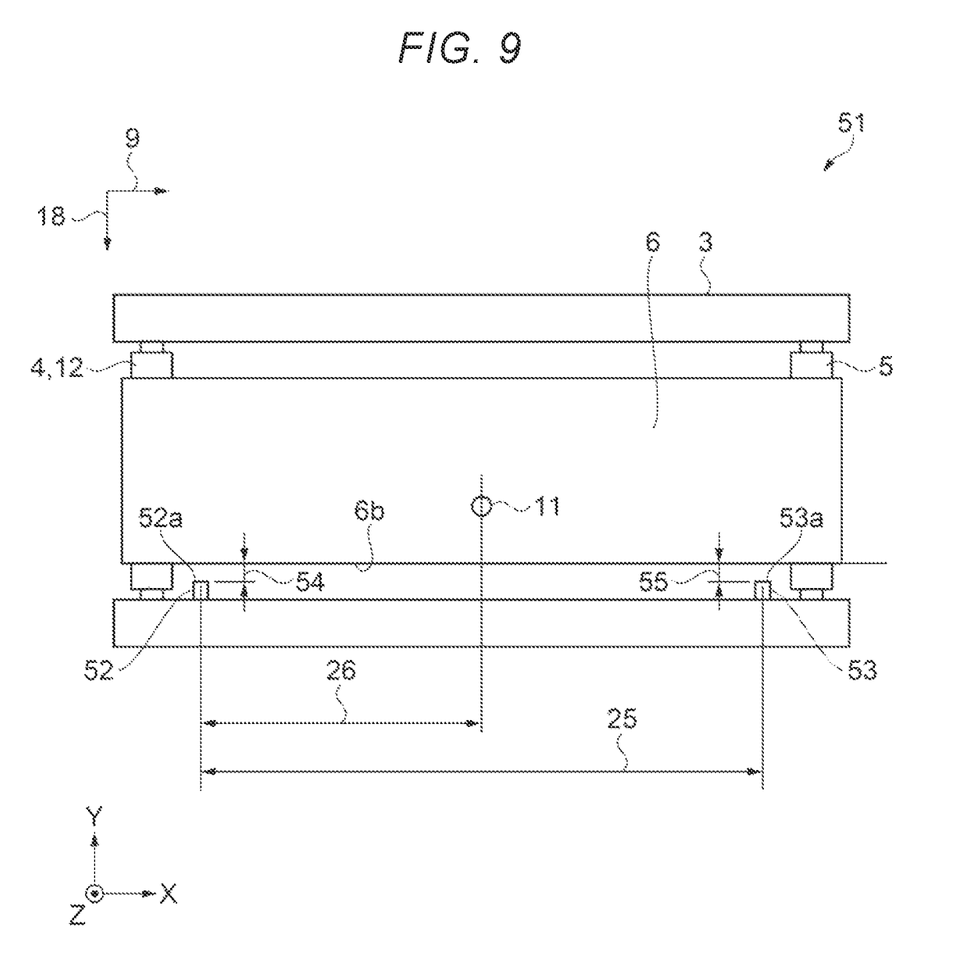
FIG. 9 is a schematic plan view showing the configuration of a belt conveyor according to a fourth embodiment.

This embodiment differs from the first embodiment in that, in a robot system 51, the device detecting the amount of shift and the amount of inclination of the belt 6 is not the first image pickup device 13 and the second image pickup device 14 and that a length measuring device detects the amount of shift and the amount of inclination of the belt 6. The robot system 51 has the first image pickup device 13. However, the first image pickup device 13 is arranged in order to detect the position of the workpiece 11.

As shown in FIG. 9, the robot system 51 has a first length measuring device 52 as a detection unit and a length measuring device, and a second length measuring device 53 as a detection unit and a length measuring device. A surface of the first length measuring device 52 that faces the belt 6 is a first detection reference position 52a. A surface of the second length measuring device 53 that faces the belt 6 is a second detection reference position 53a.

An end surface of the belt 6 in the second direction 18 is defined as a measurement surface 6b. The first length measuring device 52 detects the distance between the first detection reference position 52a and the measurement surface 6b and defines this distance as a first distance 54. The second length measuring device 53 detects the distance between the second detection reference position 53a and the measurement surface 6b and defines this distance as a third distance 55.

In this configuration, the robot system 51 includes the first length measuring device 52 and the second length measuring device 53 as detection units. By detecting the distances between the measurement surface 6b at the end of the belt 6, and the first detection reference position 52a and the second detection reference position 53a, the position and the inclination of the belt 6 in the second direction 18 can be detected.

In step S2, the first distance 54 is defined as Y1cal. The third distance 55 is defined as Y2cal. In step S4, the first distance 54 is defined as Y1img. In step S5, the first distance 54 is defined as Y1pic. The third distance 55 is defined as Y2pic.

In this configuration, too, the first length measuring device 52 and the second length measuring device 53 detect the amount of shift and the inclination of the belt 6 due to the meandering. Thus, even when the belt 6 meanders, the robot 15 can perform a task on a target object without having to correct the belt 6.

Fifth Embodiment

In the first embodiment, the inclination of the belt 6 is detected, using the first image pickup device 13 and the second image pickup device 14. The inclination of the belt 6 may be detected, using only the first image pickup device 13. For example, when the belt 6 has a length of 1 m and an amount of inclination of 1 mm, a first distance 22 of 0.2 mm may be detected with respect to a 20 mm by 20 mm first image capture range 19. In this method, too, when the belt 6 meanders, the robot 15 can perform a task on a target object without having to correct the belt 6.

What is claimed is:

1. A control method for causing a processor to execute a program sorted in a memory, the control method comprising executing on the processor the steps of:

capturing, at a first time, a first image of a first part of a moving belt of a conveyor, a target object being conveyed on the moving belt along a first direction in a normal state, a robot performing a task with respect to the target object, the moving belt having a center line extending along the first direction, the first image including a first reference position, the center line, and the target object aligned on an initial line from the first reference position, the initial line extending along a second direction perpendicular to the first direction;

capturing a second image of a second part of the moving belt, the second image including a second reference position and the center line, a distance between the first and second reference positions along the first direction being defined as a reference distance;

obtaining an imaginary line passing through the first and second reference positions, the imaginary line being parallel to the first direction;

calculating a first distance between the first reference position and the center line along the second direction based on the first image;

calculating a second distance between the second reference position and the center line along the second direction based on the second image;

calculating an inclination of the moving belt with respect to the imaginary line based on (Y1−Y2)/L, where Y1 is the first distance, Y2 is the second distance, and L is the reference distance;

calculating a normal distance between a first position of the target object in the first image and a second position of the target object at a second time later than the first time based on the first image and a signal from an encoder disposed at a pully of the conveyor when the processor determines that there is no inclination of the moving belt;

calculating an abnormal distance between the first position and a third position of the target object at the second time based on (Y1−Y2)×Xcnv/L, where Xcnv is the normal distance when the processor determines that there is the inclination of the moving belt; and causing the robot to perform the task with respect to the target object based on the normal distance or the abnormal distance.

2. The control method for the robot according to claim 1, wherein the first reference position in the first image is located at an edge of the first image and is spaced apart from the center line along the second direction, and the second reference position in the second image is located at an edge of the second image and is spaced apart from the center line along the second direction.

3. A robot system comprising:

a conveyor having a moving belt on which a target object is placed, the target object being conveyed on the moving belt along a first direction in a normal state, a robot performing a task with respect to the target object, the moving belt having a center line extending along the first direction;

an image pickup device configured to capture a first image of a first part of the moving belt and a second image of a second part of the moving belt;

a memory configured to store a program; and a processor configured to execute the program so as to:

cause the image pickup device to capture the first image at a first time, the first image including a first reference position, the center line, and the target object aligned on an initial line from the first reference position, the initial line extending along a second direction perpendicular to the first direction;

cause the image pickup device to capture the second image, the second image including a second reference position and the center line, a distance between the first and second reference positions along the first direction being defined as a reference distance;

obtain an imaginary line passing through the first and second reference positions, the imaginary line being parallel to the first direction;

calculate a first distance between the first reference position and the center line along the second direction based on the first image;

calculate a second distance between the second reference position and the center line along the second direction based on the second image;

calculate an inclination of the moving belt with respect to the imaginary line based on (Y1−Y2)/L, where Y1 is the first distance, Y2 is the second distance, and L is the reference distance;

calculate a normal distance between a first position of the target object in the first image and a second position of the target object at a second time later than the first time based on the first image and a signal from an encoder disposed at a pully of the conveyor when the processor determines that there is no inclination of the moving belt;

calculate an abnormal distance between the first position and a third position of the target object at the second time based on (Y1−Y2)×Xcnv/L, where Xcnv is the normal distance when the processor determines that there is the inclination of the moving belt; and cause the robot to perform the task with respect to the target object based on the normal distance or the abnormal distance.

4. The robot system according to claim 3, wherein
the first reference position in the first image is located at an edge of the first image and is spaced apart from the center line along the second direction, and
the second reference position in the second image is located at an edge of the second image and is spaced apart from the center line along the second direction.

5. The robot system according to claim 3, wherein
the first part of the moving belt is located at an upstream end of the moving belt, and
the second part of the moving belt is located at a downstream end of the moving belt.

6. The control method for the robot according to claim 1, wherein
the first part of the moving belt is located at an upstream end of the moving belt, and
the second part of the moving belt is located at a downstream end of the moving belt.

\* \* \* \* \*